(12) United States Patent
Lin et al.

(10) Patent No.: US 11,796,337 B2
(45) Date of Patent: Oct. 24, 2023

(54) METHOD FOR GENERATING VIRTUAL NAVIGATION ROUTE

(71) Applicant: FENG CHIA UNIVERSITY, Taichung (TW)

(72) Inventors: Yu-Chen Lin, Taichung (TW); Yu-Ching Chan, Taichung (TW); Ming-Chih Lin, Taichung (TW)

(73) Assignee: Feng Chia University, Taichung (TW)

( * ) Notice: Subject to any disclaimer, the term of this patent is extended or adjusted under 35 U.S.C. 154(b) by 350 days.

(21) Appl. No.: 17/367,997

(22) Filed: Jul. 6, 2021

(65) Prior Publication Data

US 2022/0333945 A1 Oct. 20, 2022

(30) Foreign Application Priority Data

Apr. 19, 2021 (TW) .................................. 110113894

(51) Int. Cl.
*G06F 17/00* (2019.01)
*G01C 21/36* (2006.01)
(Continued)

(52) U.S. Cl.
CPC ....... *G01C 21/367* (2013.01); *G01C 21/3676* (2013.01); *G06T 19/006* (2013.01); *G06V 20/49* (2022.01); *G06V 20/58* (2022.01)

(58) Field of Classification Search
CPC .............. G01C 21/367; G01C 21/3676; G01C 21/365; G06T 19/006; G06V 20/49; G06V 20/58
(Continued)

(56) References Cited

U.S. PATENT DOCUMENTS 8,884,782 B2 * 11/2014 Rubin ............... H04W 74/0816
340/436
10,215,583 B2 * 2/2019 Ng-Thow-Hing .........................
G01C 21/3658
(Continued)

FOREIGN PATENT DOCUMENTS

| CN | 111521192 A | 8/2020 |
| CN | 111854780 A | 10/2020 |
| TW | I657409 B | 4/2019 |

OTHER PUBLICATIONS

Virtual navigation tested on a mobile app . . . (Year: 2019).*
(Continued)

*Primary Examiner* — Ronnie M Mancho
(74) *Attorney, Agent, or Firm* — Rosenberg, Klein & Lee

(57) ABSTRACT

The present invention provides a method for generating a virtual navigation route, by obtaining multiple navigation points each with a flag data; identifying at least two lanes from a front video data; creating a navigation characteristic image according to the flag data, the navigation points, the front video data, and the at least two lanes, wherein the navigation characteristic image has multiple dotted grids; calculating a probability of a navigation route passing through each dotted grid, and setting the dotted grid with the highest probability calculated in each row of the navigation characteristic image as a first default value; and fitting curves for the grids with the first default value as the navigation route; the navigation route is generated in real time and projected over the front video data using an augmented reality (AR) method, achieving AR effects and navigating with better representation of the traffic.

15 Claims, 14 Drawing Sheets

(51) Int. Cl.
*G06V 20/58* (2022.01)
*G06V 20/40* (2022.01)
*G06T 19/00* (2011.01)

(58) Field of Classification Search
USPC .......................................................... 701/455
See application file for complete search history.

(56) References Cited

U.S. PATENT DOCUMENTS

| | | | |
|---|---|---|---|
| 10,282,915 | B1 * | 5/2019 | Lin .......................... G06T 17/00 |
| 10,631,269 | B2 * | 4/2020 | Rubin .............. G08G 1/096791 |
| 11,172,467 | B2 * | 11/2021 | Rubin ...................... H04L 67/12 |
| 11,280,632 | B2 * | 3/2022 | Pögel ...................... G01S 19/42 |
| 2012/0224060 | A1 * | 9/2012 | Gurevich ............... G06V 20/58 |
| | | | 348/148 |
| 2013/0278440 | A1 * | 10/2013 | Rubin .............. G08G 1/096791 |
| | | | 340/903 |
| 2016/0003636 | A1 * | 1/2016 | Ng-Thow-Hing ... G01C 21/365 |
| | | | 701/418 |
| 2019/0034740 | A1 * | 1/2019 | Kwant ................. G06V 10/462 |
| 2020/0229137 | A1 * | 7/2020 | Rubin ...................... H04W 4/46 |
| 2020/0247431 | A1 | 8/2020 | Ferencz et al. |

OTHER PUBLICATIONS

International Patent Office Official Action issued by Foreign Patent Office for corresponding Application No. 11120065630/110113894.

\* cited by examiner

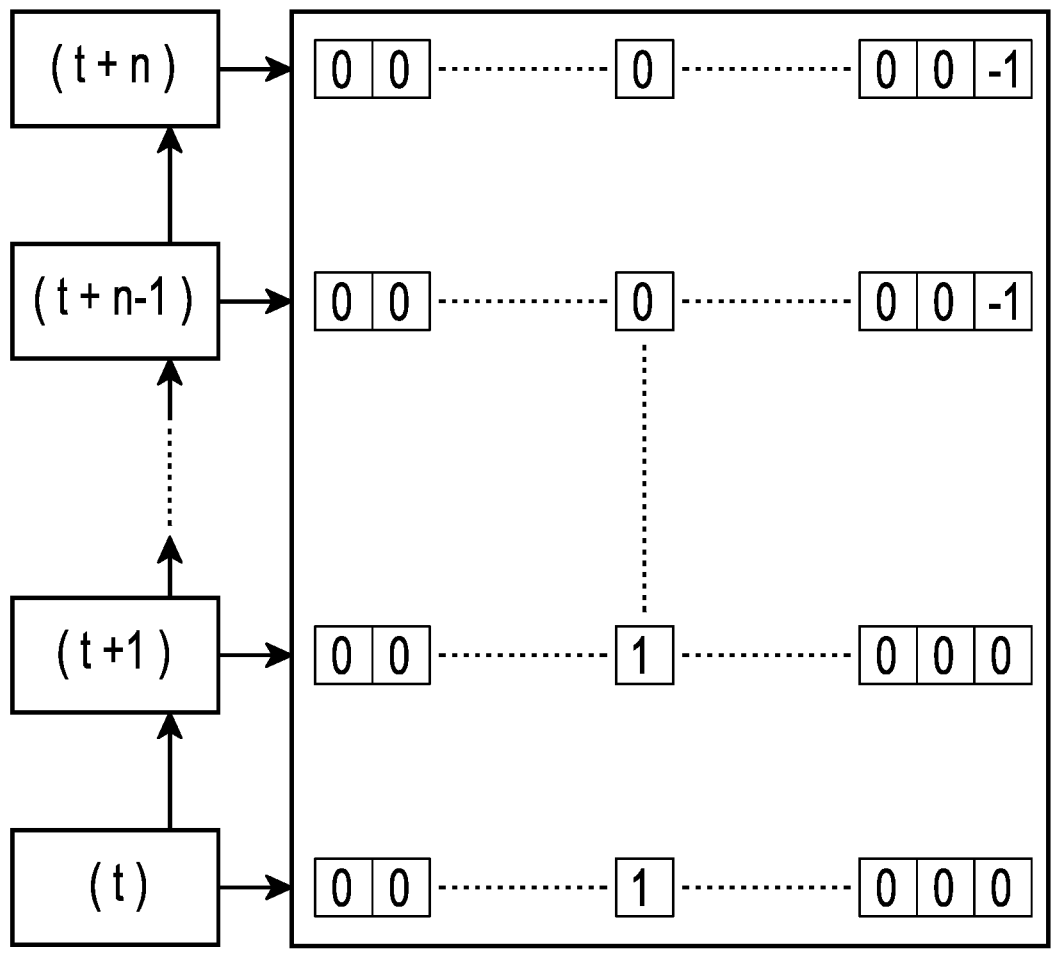
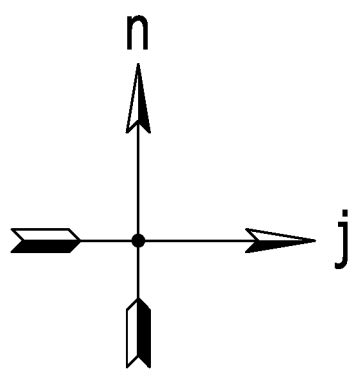
FIG.6A

METHOD FOR GENERATING VIRTUAL NAVIGATION ROUTE

CROSS-REFERENCE TO RELATED APPLICATION(S)

This application claims the priority benefit of TW application serial No. 110113894 filed on Apr. 19, 2021, the entirety of which is hereby incorporated by reference herein and made a part of specification.

BACKGROUND OF THE INVENTION

1. Field of the Invention

A method for generating a virtual navigation route, in particular a method for generating a virtual navigation route by utilizing a navigation characteristic image.

2. Description of the Related Art

A conventional navigator mostly uses a virtual map and voice cues to navigate a driver where to go. Sometimes a 3 dimensional (3D) virtual map is used by the conventional navigator when a vehicle approaches a wide cross road, a highway ramp, or an expressway ramp. However if the driver is not familiar with an approaching intersection, or if an approaching intersection is complicated, the conventional navigator still might not deliver instructions obvious enough for the driver. In other words, the conventional navigator might not be straightforward enough with its navigation instructions. This might cause the driver to suddenly change lanes or miss a turn due to time spent comprehending the navigation instructions. As the driver is distracted by the conventional navigator for figuring out how a virtual map applies to an approaching complicated intersection, the driver might drive dangerously and cause accidents.

Furthermore, since the conventional navigator does not precisely detect whether the vehicle is currently in a fast lane or in a slow lane, when the vehicle is driving in the fast lane yet needs to make a right turn in the approaching intersection, or vise-versa when the vehicle is in the slow lane yet needs to make a left turn, the conventional navigator simply boldly instructs the driver to make a turn, causing the driver to hastily switch lanes right before the intersection and as a result causing traffic accidents.

With reference to FIG. 13, a screen I of the conventional navigator is used to navigate the driver. The screen I instructs the driver to follow the navigation route 90, yet since the navigation route 90 is simply displayed on the screen I, a problem can arise as depicted in FIG. 13 wherein the navigation route 90 overlaps with an image of car C. This might cause the driver to misunderstand the navigation route 90, or get distracted from the road trying to figure out the instruction displayed, and ultimately leading to possible road accidents.

SUMMARY OF THE INVENTION

The present invention provides a method for generating virtual navigation route, including the following steps:

obtaining a front video data, a moving route from a first point to a second point, and a navigation point data, wherein the navigation point data includes multiple navigation points, the navigation points are lined up accordingly on the moving route, and each of the navigation points is marked with a flag data;

identifying at least two lanes from the front video data;

creating a navigation characteristic image according to the flag data, the navigation points, the front video data, and the at least two lanes together, wherein the navigation characteristic image is rectangular and has multiple dotted grids;

calculating a probability of a navigation route passing through each of the dotted grids, and setting the dotted grid that has the highest probability calculated in each row of the navigation characteristic image as a first default value;

fitting curves for the grids with the first default value as the navigation route.

The present invention encodes the navigation characteristic image chronologically so as to represent the navigation route predicted in real time. The navigation route is mapped from fitting curves between the grids, and then the navigation route is projected over the front video data using an augmented reality (AR) method, converting back a frontal view data for the vehicle. This way the navigation route is able to fit in with an actual front view of the vehicle with right size ratio and right relative positions, achieving AR effects.

BRIEF DESCRIPTION OF THE DRAWINGS

FIG. 6A is a perspective view of probability distributions over multiple dotted grids of the present invention.

DETAILED DESCRIPTION OF THE INVENTION

To understand characteristics and effects of the present invention in detail, an embodiment of the present invention is described in the following figures. The embodiment of the present invention can be put into practice following the present invention.

Figure 1:
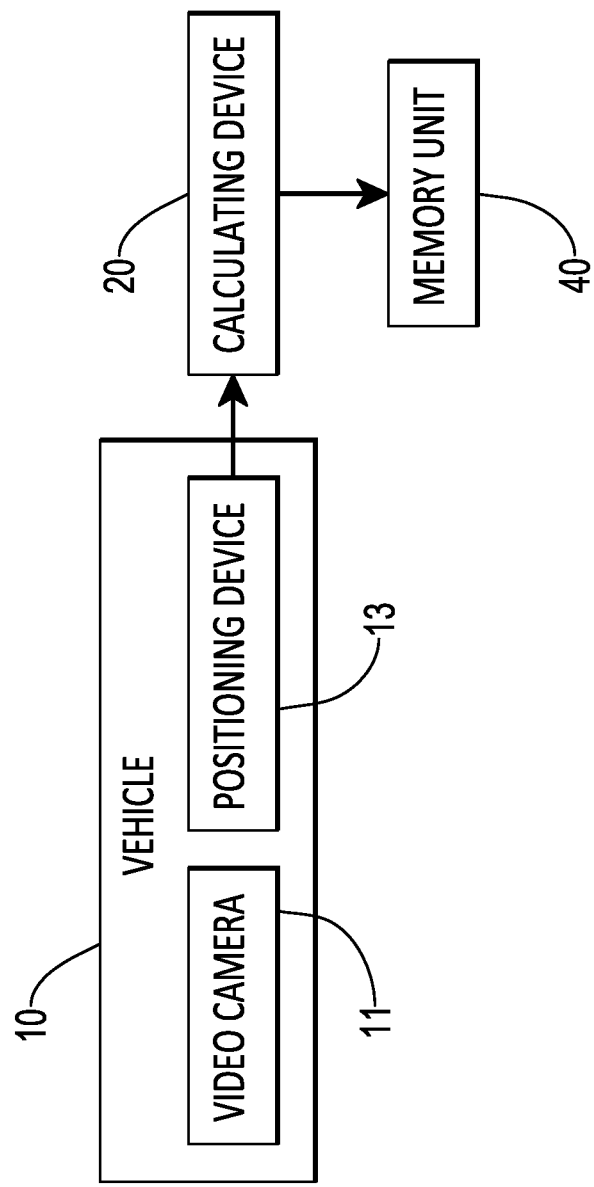
FIG. 1 is a block diagram of a first system of the present invention.

With reference to FIG. 1, the present invention describes a method for generating a virtual navigation route. The method for generating a virtual navigation route of the present invention is executed by a video camera 11, a positioning device 13, and a calculating device 20. The video camera 11 and the positioning device 13 are mounted on a vehicle 10, and the calculating device 20 is also mountable on the vehicle 10. The calculating device 20 is electrically connected to the video camera 11 and the positioning device 13. The positioning device 13 is functional for the Global Positioning System (GPS).

Figure 2:
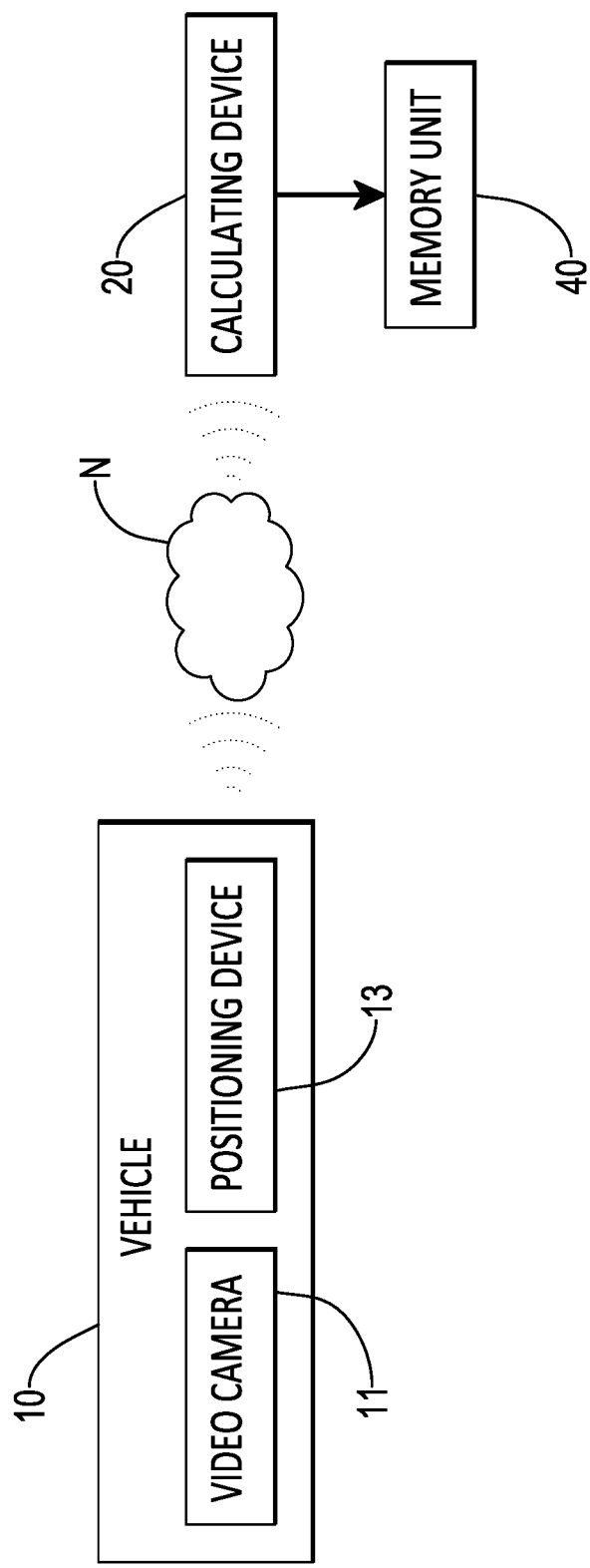
FIG. 2 is a block diagram of a second system of the present invention.

With reference to FIG. 2, alternatively, the calculating device 20 can also be a cloud server, and the calculating device 20 can then be settled elsewhere such as a server room. This way the calculating device 20 is wirelessly connected to the video camera 11 and the positioning device 13 via a wireless network N. The calculating device 20 can also be a set of Fully Convolutional Networks (FCNs). The present invention can further include a memory unit 40, wherein the memory unit 40 electrically connects the calculating device 20 for saving calculation results from the calculating device 20. The memory unit 40 can be a hard drive or a Network Attached Storage (NAS).

Figure 3:
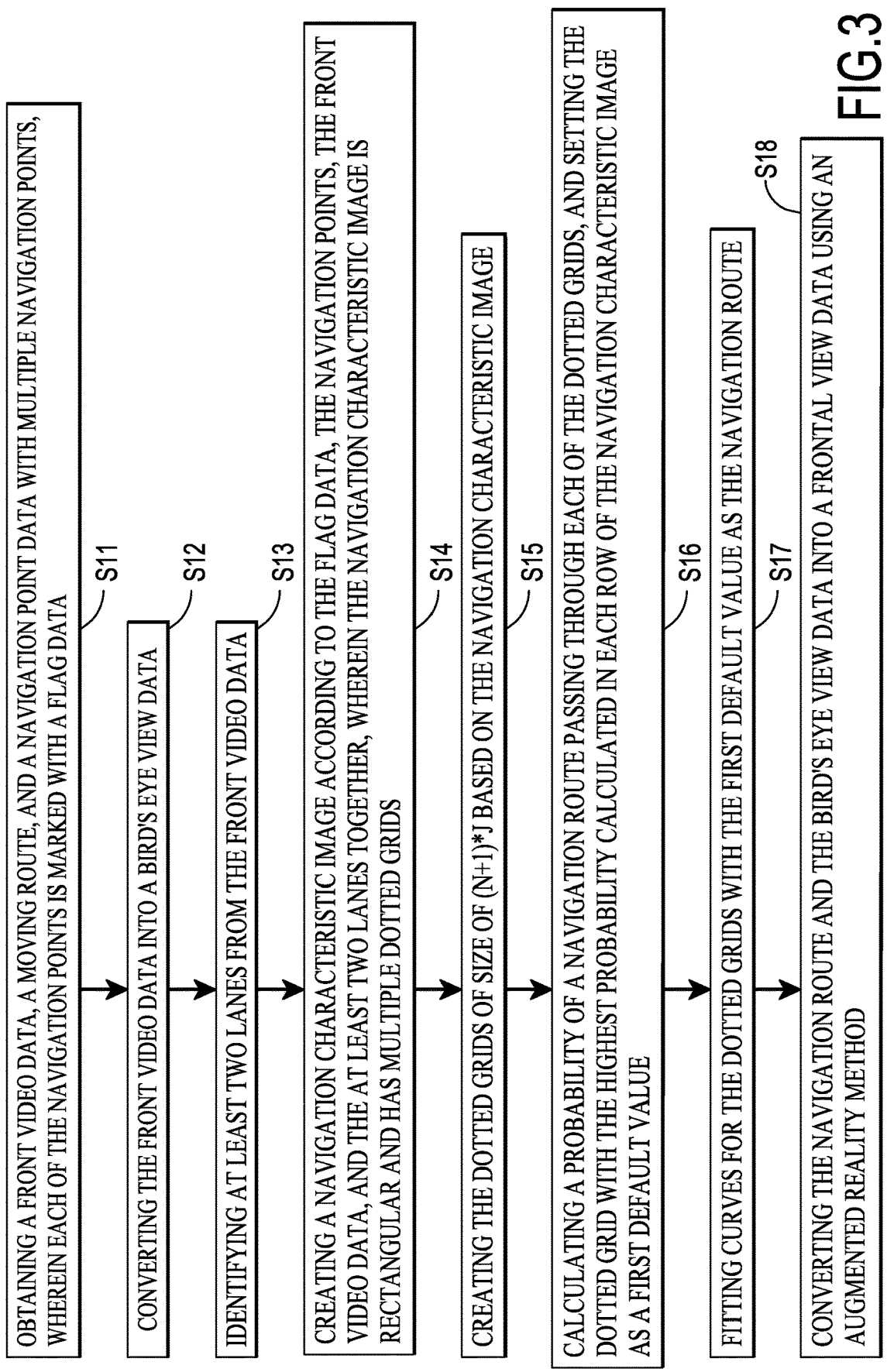
FIG. 3 is a flow chart of the present invention.

With reference to FIG. 3, with the video camera 11, the positioning device 13, and the calculating device 20, the method for generating a virtual navigation route of the present invention is executed with the following steps:

step S11: obtaining a front video data 30, a moving route from a first point to a second point, and a navigation point data, wherein the navigation point data includes multiple navigation points, the navigation points are lined up accordingly on the moving route, and each of the navigation points is marked with a flag data;

step S12: converting the front video data 30 into a bird's eye view data;

step S13: identifying at least two lanes 31 from the front video data 30;

step S14: creating a navigation characteristic image according to the flag data, the navigation points, the front video data 30, and the at least two lanes together, wherein the navigation characteristic image is rectangular and has multiple dotted grids;

step S15: creating the dotted grids of size of (n+1)*j based on the navigation characteristic image;

step S16: calculating a probability of a navigation route passing through each of the dotted grids, and setting the dotted grid that has the highest probability calculated in each row of the navigation characteristic image as a first default value;

step S17: fitting curves for the dotted grids with the first default value as the navigation route;

step S18: converting the navigation route and the bird's eye view data into a frontal view data using an augmented reality (AR) method.

Figure 4:
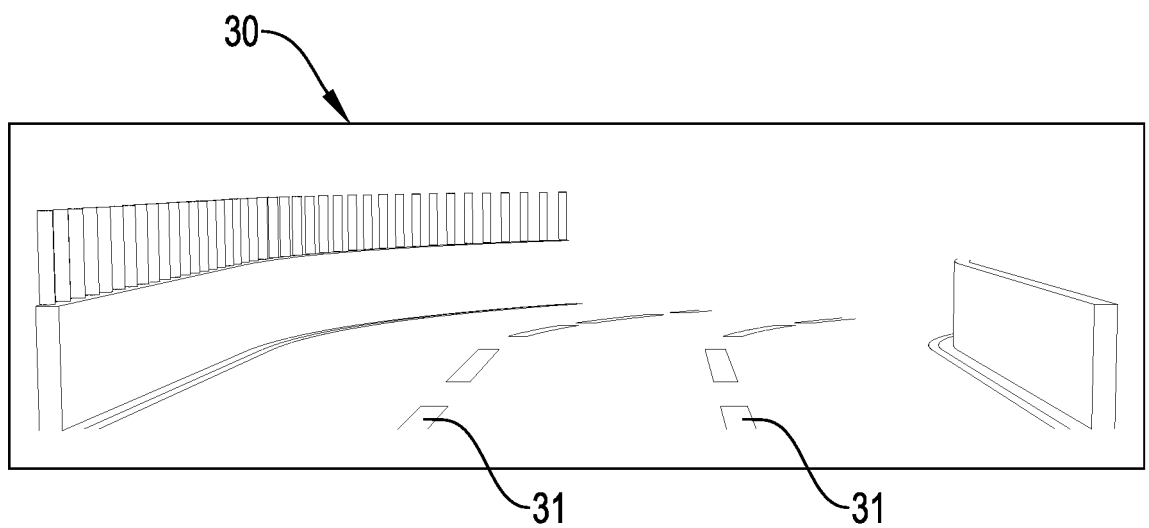
FIG. 4 is a perspective view of a front video data of the present invention.

With reference to FIG. 4, in step S11, the video camera 11 captures footage of the vehicle 10 moving as the front video data 30. Simultaneously, the positioning device 13 creates a moving route and the navigation point data, wherein the moving route is a route for the vehicle 10 to move from the first point to the second point. The first point is where the vehicle 10 starts moving and the second point is where the vehicle 10 stops moving. In practice, the present invention allows a user to enter positions of the first point and the second point through the positioning device 13. The positioning device 13 is then able to automatically create the moving route between the first point and the second point based on the positions entered. The moving route represents a best route for the vehicle 10 to move from the first point to the second point. The best route can either be a route with the shortest travel distance or a route with the least amount of travel time. The positioning device 13 is adaptable to Google map, wherein the positioning device 13 can assign the moving route according to Google map's information.

The navigation point data is created from the moving route, and the navigation point data includes multiple navigation points. The navigation points are positioned along the moving route, and any two of the navigation points adjacent to each other are located a distance apart. In the embodiment of the present invention, the distance is 100 m. The distance however is free to be any other values such as 50 m, 25 m, or 200 m. The greater the distance is, the less the navigation points are, and vice-versa. Namely, the less the distance is, the greater the navigation points are. The navigation points are represented in a geographic coordinate system as latitudes and longitudes. Furthermore, the calculating device 20 marks each of the navigation points with a flag data, and each flag data is represented as 1. Table 1 below demonstrates an example of how the navigation points are represented:

TABLE 1

| Navigation point | Latitude | Longitude | Flag data |
|---|---|---|---|
| 1 | 24.19967283 | 120.64329383 | 1 |
| 2 | 24.19977200 | 120.64334817 | 1 |
| 3 | 24.20006583 | 120.64350383 | 1 |
| 4 | 24.77505018 | 120.64360833 | 1 |
| 5 | 24.20074050 | 120.64387300 | 1 |
| 6 | 0 | 0 | 0 |

In step S12, the calculating device 20 converts the front video data 30 into the bird's eye view data for calculation convenience purposes. By converting the front video data 30 into the bird's eye view data, the calculating device obtains a top view of the front video data 30A. The bird's eye view data and the front video data 30 differ as a content of the front video data 30 has been changed to represent a view of a bird's eye when converted into the bird's eye view data.

Figure 5:
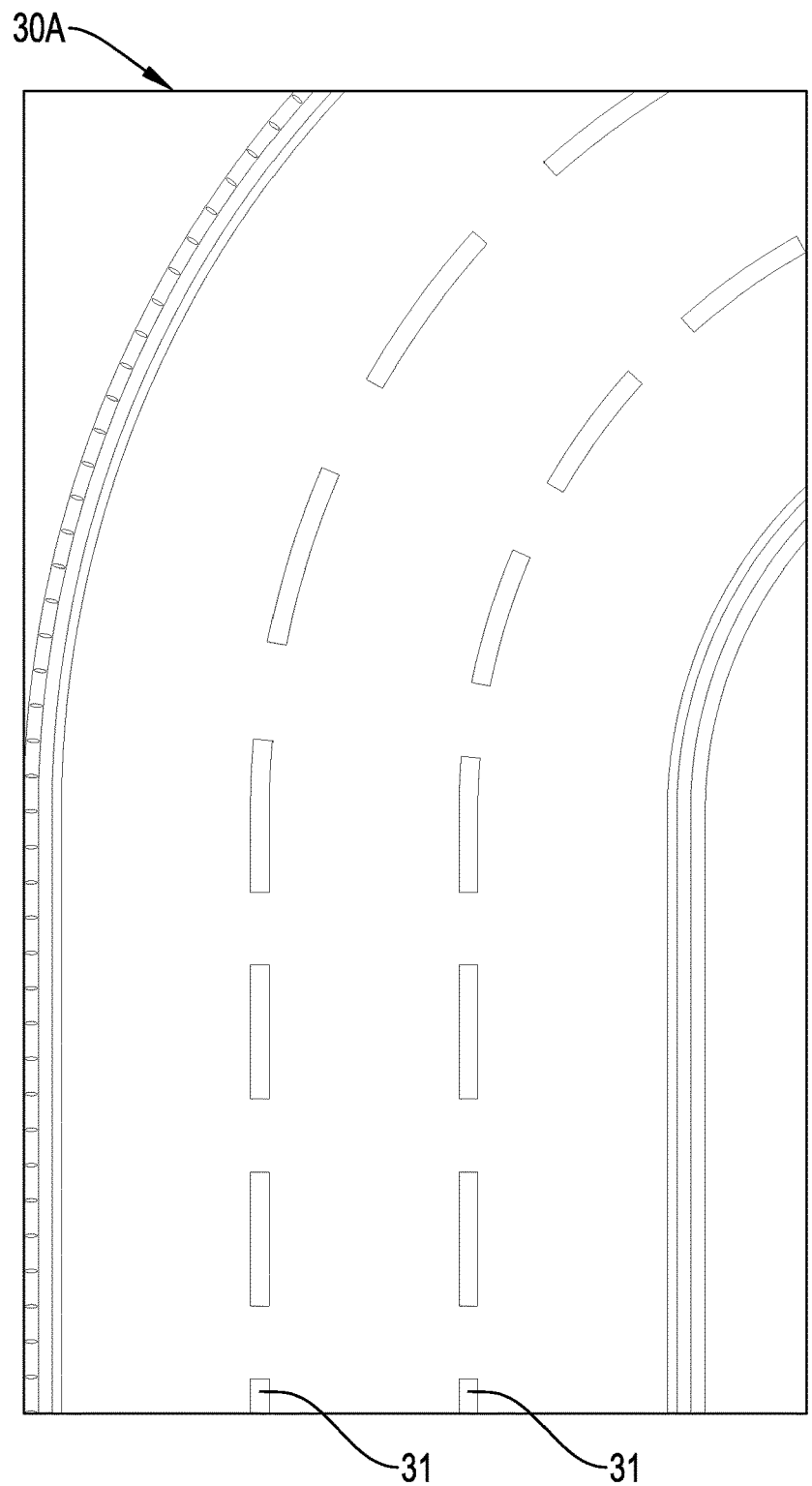
FIG. 5 is a perspective view of a bird's eye view data of the present invention.

With further reference to FIGS. 4 and 5, in step S13, the calculating device 20 obtains the top view of the front video data 30A from the video camera 11, and then identifies the at least two lanes 31 from the front video data 30A. The calculating device 20 may employ semantic segmentation or instance segmentation as means to identify the at least two lanes 31 from the front video data 30A. The front video data 30A and the at least two lanes 31 can exist as codes in the present invention. Here in the embodiment of the present invention, the calculating device 20 employs semantic segmentation to generate a semantic segmented characteristic image for identifying the at least two lanes 31. In another embodiment of the present invention, the calculating device 20 employs instance segmentation to generate an instance segmented characteristic image for identifying the at least two lanes 31.

Furthermore, the calculating device 20 can also identify at least one obstacle from the front video data 30A. The at least one obstacle includes pedestrians, vehicles 10 in front, refuge islands, or other transports. If semantic segmentation is employed, the calculating device 20 will be able to efficiently identify the at least two lanes 31 from the front video data 30A. On the other hand, if instance segmentation is employed, the calculating device 20 will be able to additionally identify other objects with precision apart from identifying the at least two lanes 31 from the front video data 30A. The other objects include the refuge islands and the pedestrians described above, but also traffic cones, or other vehicles. For instance, if there are two vehicles in front of the driver and if instance segmentation is employed, the calculating device 20 will then be able to identify apart the two vehicles in front as different vehicles and as vehicle A and vehicle B. Apart from employing semantic segmentation or instance segmentation to identify the at least two lanes 31, the calculating device 20 is also free to employ other identifying methods such a lane identifying algorithm, a Hough transform, or a Landnet method.

In steps S14 and S15, the calculating device 20 concatenates (concats) the flag data, the navigation points, the front video data 30A, and the at least two lanes together to create a navigation characteristic image. The navigation characteristic image is rectangular and has multiple dotted grids 33. With reference to FIG. 6A, the navigation characteristic image includes the dotted grids 33 of size of (n+1)*j. The $n^{th}$ row is chronologically encoded along j columns and assembled into a matrix. For instance, as t represents time, let t starts at t=1, in this case the dotted grids 33 of size (n+1)*j include a matrix of row 1 to row (n+1) representing the starting position of the vehicle 10. At t=2, the dotted grids 33 are still of size (n+1)*j, yet the window of the matrix is updated as now row 2 to row (n+2) are shown, as row 1 is now neglected and row (n+2) is newly added to the matrix of the dotted grids 33.

In step S16, the calculating device 20 calculates the probability of the navigation route 351 passing through each of the dotted grids 33, and setting the dotted grid that has the highest probability calculated in each row of the navigation characteristic image as the first default value. In other words, at each time t, a probability distribution of the navigation route is distributed across all $j^{th}$ columns of each row in the matrix. The first default value is free to be 1 or any other values. In the embodiment of the present invention, the probability is calculated by the calculating device 20 as follows:

setting the sum of all probabilities of a row of the dotted grids 33 as 1;

concatenating the flag data and the navigation points, and obtaining the probability of the navigation route 351 passing through each of the dotted grids 33.

Figure 6B:
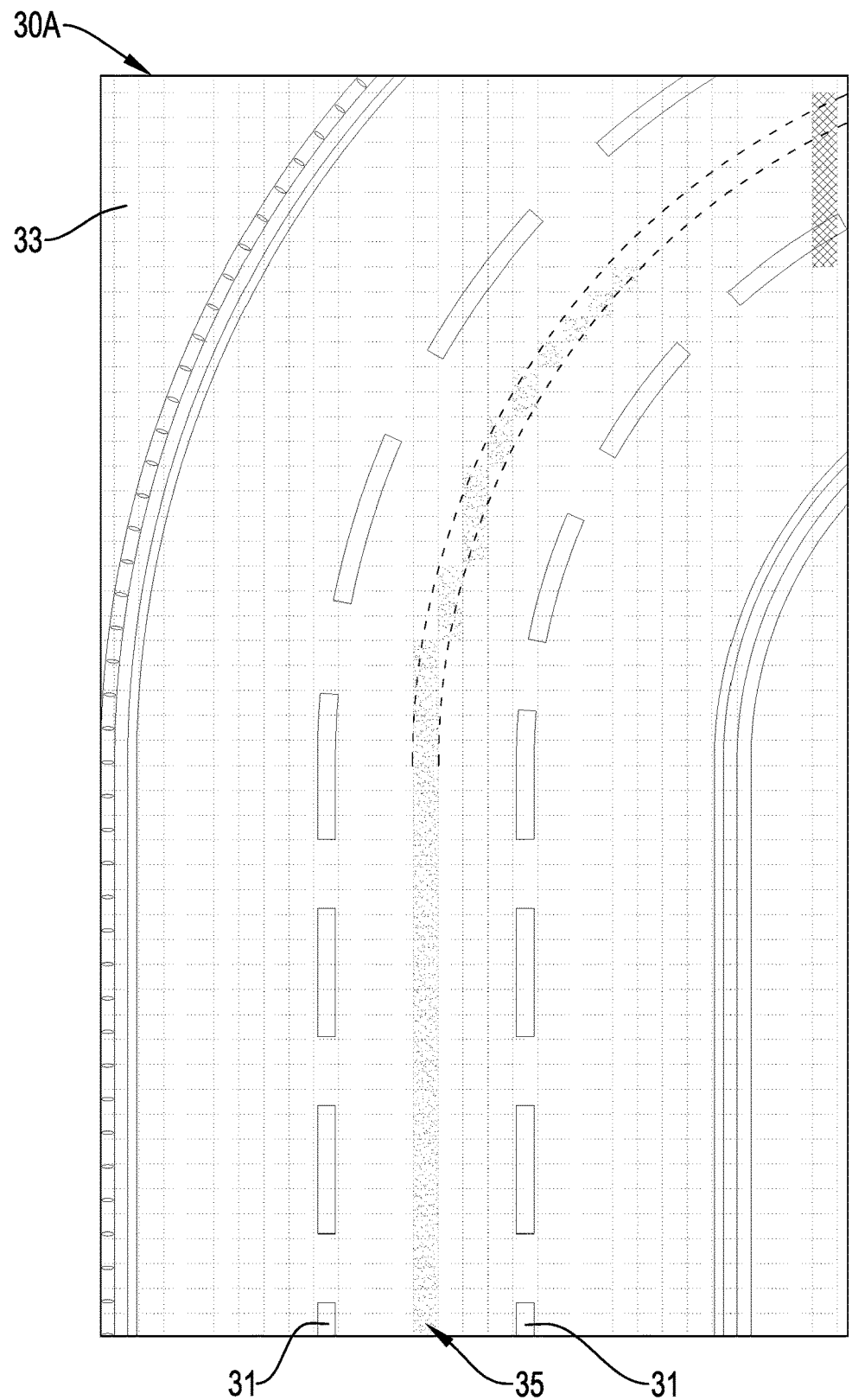
FIG. 6B is a perspective view of how the dotted grids combine with the front video data of the present invention.

In step S16, the calculating device 20 may employ different artificial intelligent (AI) algorithms such as transformer learning, self-attention, or gated recurrent unit (GRU) to calculate the probability of the navigation route 351 passing through each of the dotted grids 33. The calculating device 20 may also employ methods of softmax function, rectified linear unit (ReLU), or generative adversarial network-long short-term memory (GAN-LSTM) to calculate the probability of the navigation route 351 passing through each of the dotted grids 33. With reference to FIG. 6B, the calculating device 20 extracts the dotted grids 33, with grids having the first default values, as positions with the best chance of having the navigation route 351 passing through.

In the present invention, each of the dotted grids 33 corresponds to at least one pixel from a sensor of the video camera 11, and the dotted grids 33 corresponds to arrays of pixels. For instance, in another embodiment of the present invention, the dotted grids 33 corresponds to 416 arrays of 416 pixels, or in other words, a square of 416 pixels times 416 pixels. The dotted grids 33 is a matrix with 26 times 26 elements, meaning that each element of the dotted grids 33 represents 16 pixels, as 416 divided by 26 equals 16. This way, each element of the dotted grids 33 corresponds to more video signals coming from the pixels.

In another embodiment of the present invention, each pixel represents an element of the dotted girds 33. In this case, the dotted girds 33 is able to avoid possible nuances of having multiple pixels representing an element of the dotted grids 33.

Figure 7:
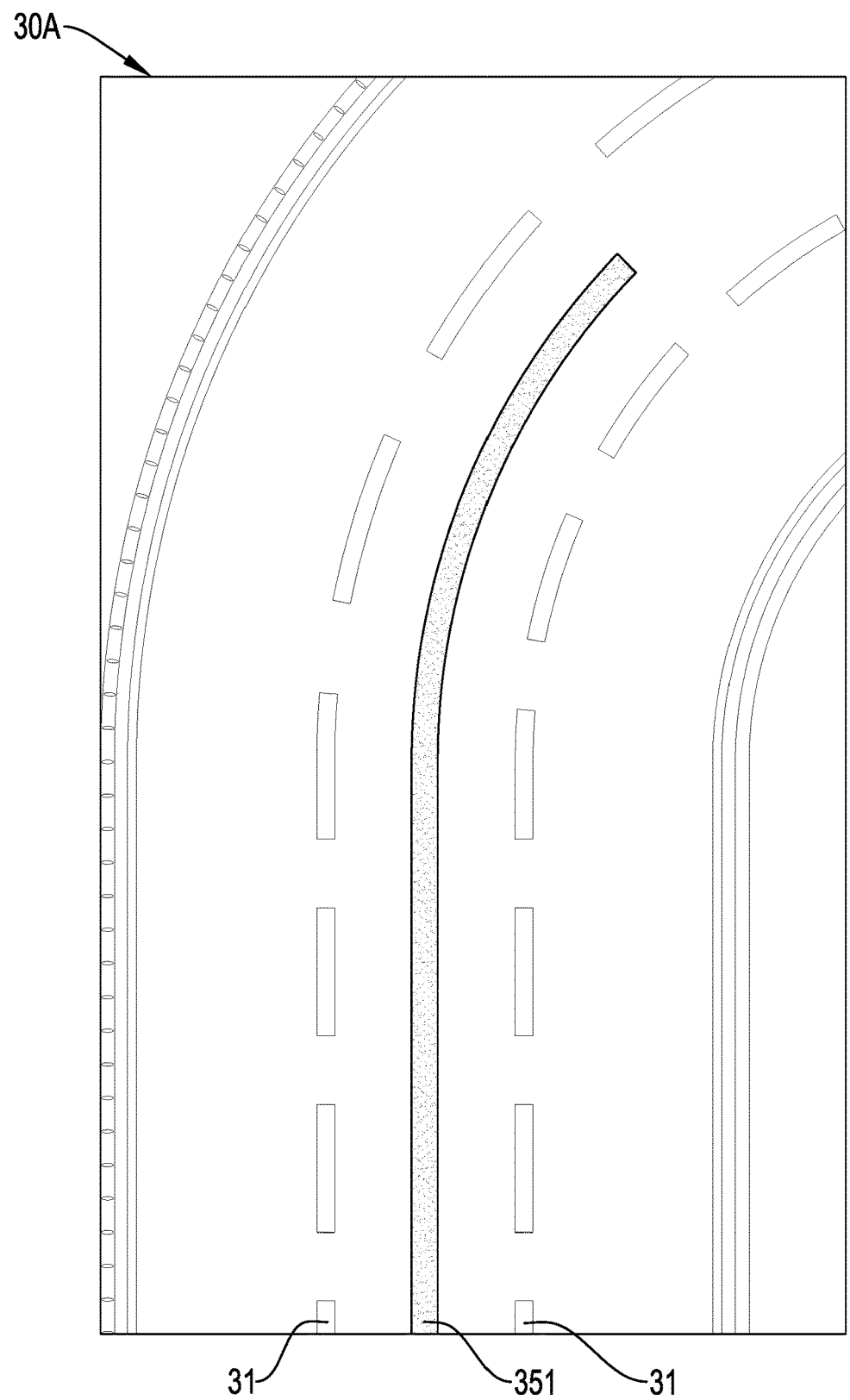
FIG. 7 is a perspective view of a creation of a navigation route of the present invention.
Figure 9:
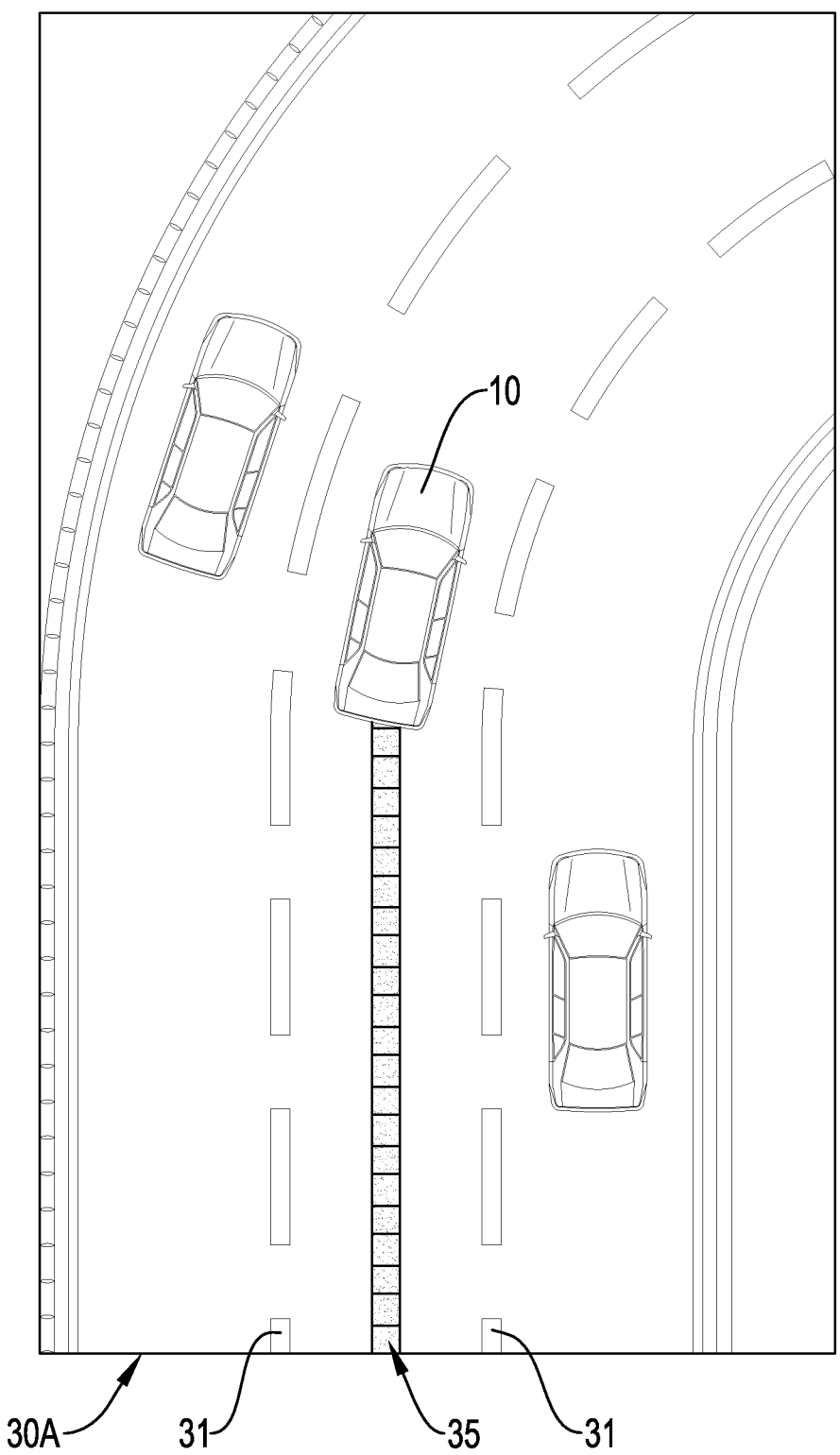
FIG. 9 is a perspective view of a combination of the navigation route and the front video data of the present invention.
Figure 10:
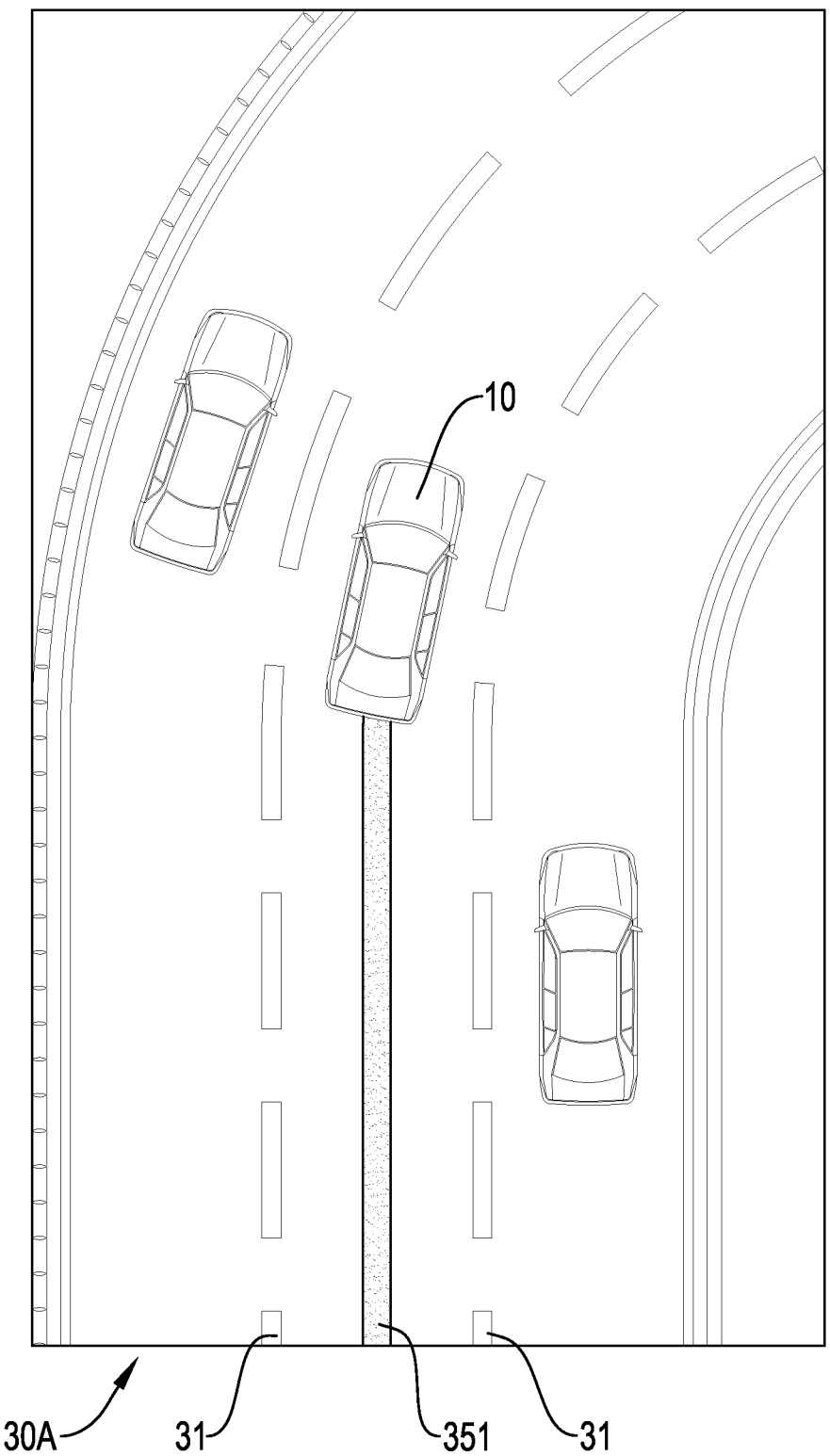
FIG. 10 is another perspective view of the combination of the navigation route and the front video data of the present invention.

With further reference to FIGS. 7 and 9, in step S17, the calculating device 20 fits curves for the dotted grids 33 with the first default value as the navigation route 351. With reference to FIG. 7, the calculating device 20 continuously fits smooth curves for the dotted grids 33 with the first default value as the navigation route 351.

Figure 8:
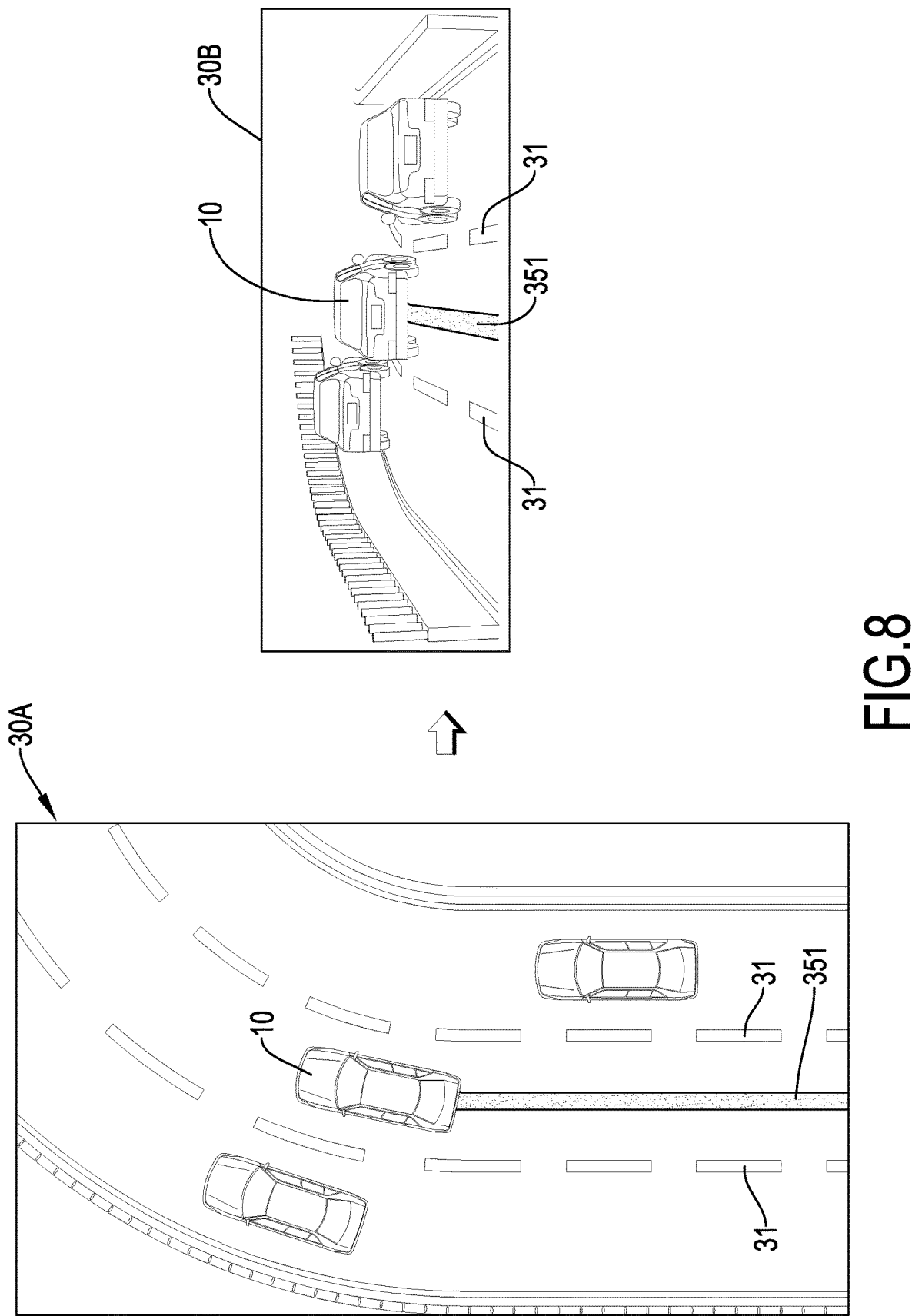
FIG. 8 is a perspective view of a conversion from the bird's eye view data to a frontal view data for the vehicle of the present invention.
Figure 11:
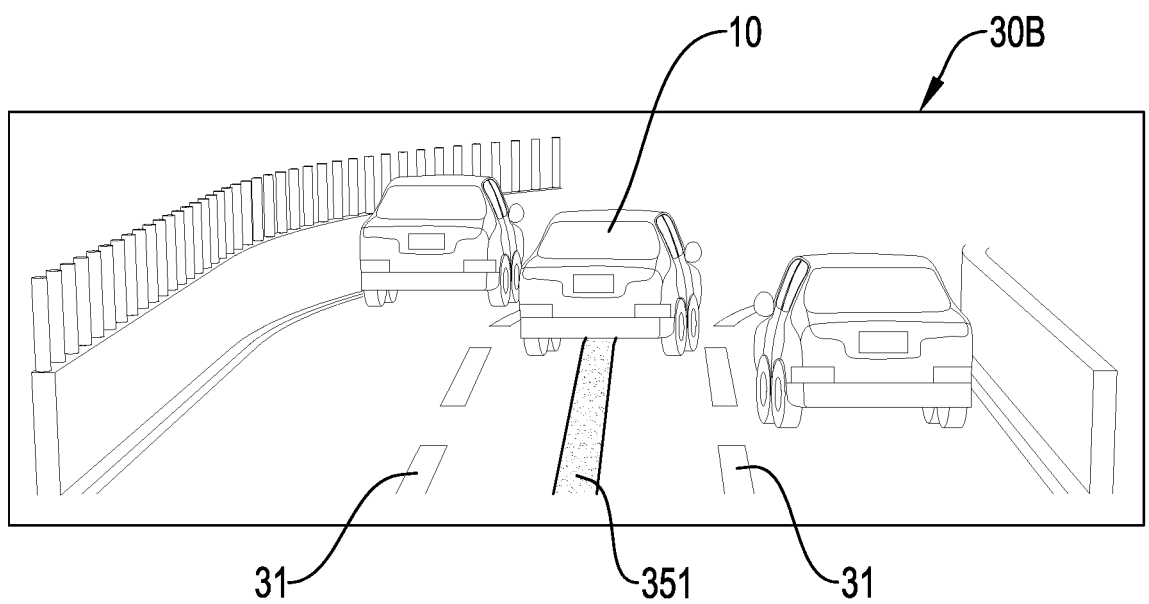
FIG. 11 is a screen display perspective view of the frontal view data for the vehicle of the present invention.

With further reference to FIGS. 8 and 11, in the embodiment of the present invention, step S18 is further included. In Step 18 the calculating device 20 converts the navigation route 351 and the bird's eye view data into the frontal view data 30B using the augmented reality (AR) method. The AR method allows the front video data 30A and the navigation route 351 to be converted into the frontal view data 30B so the driver enjoys the convenience of looking at the virtual navigation route 351 and a real time feed of the front of the car simultaneously.

Figure 12:
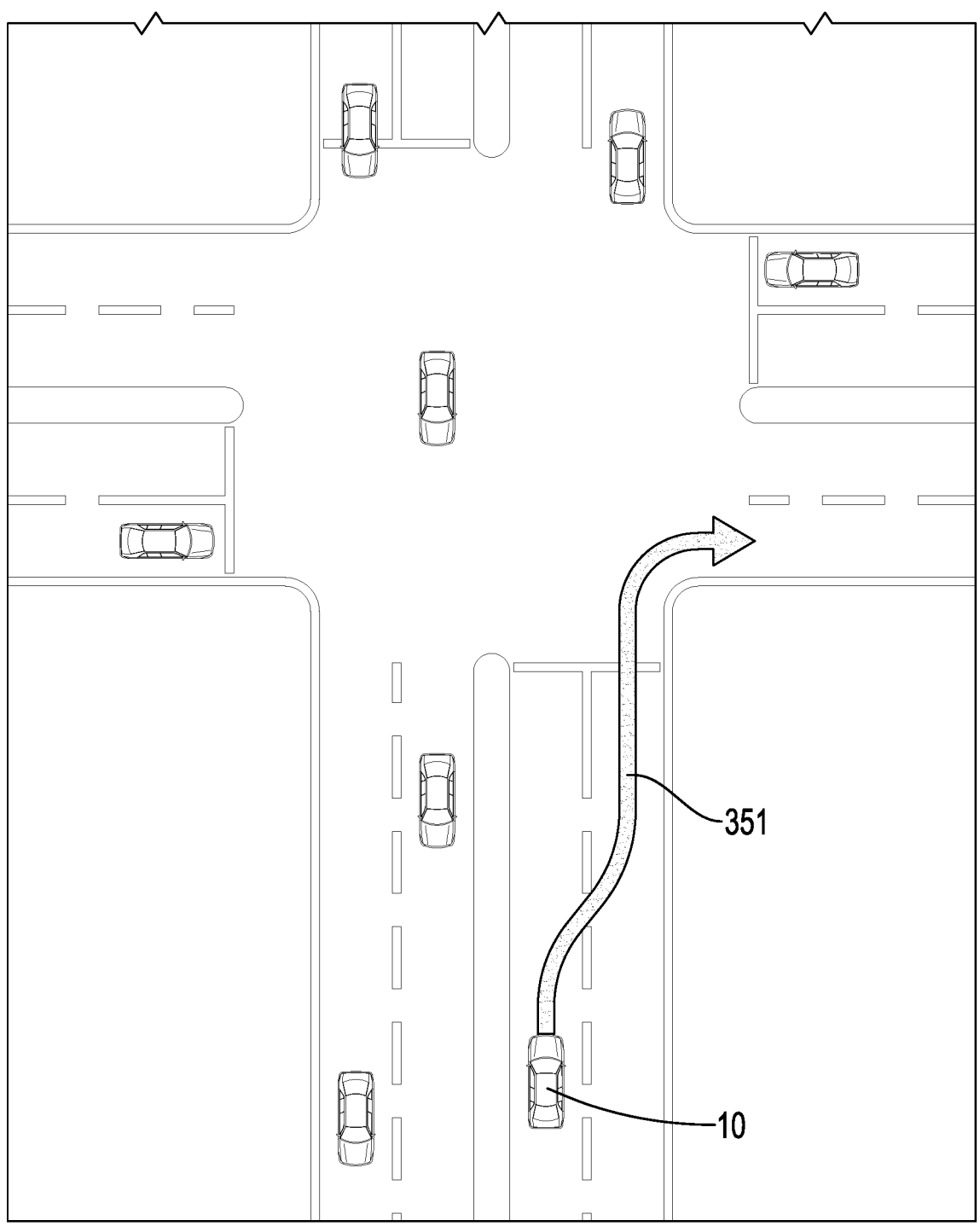
FIG. 12 is a perspective view of the navigation route of the present invention.
Figure 13:
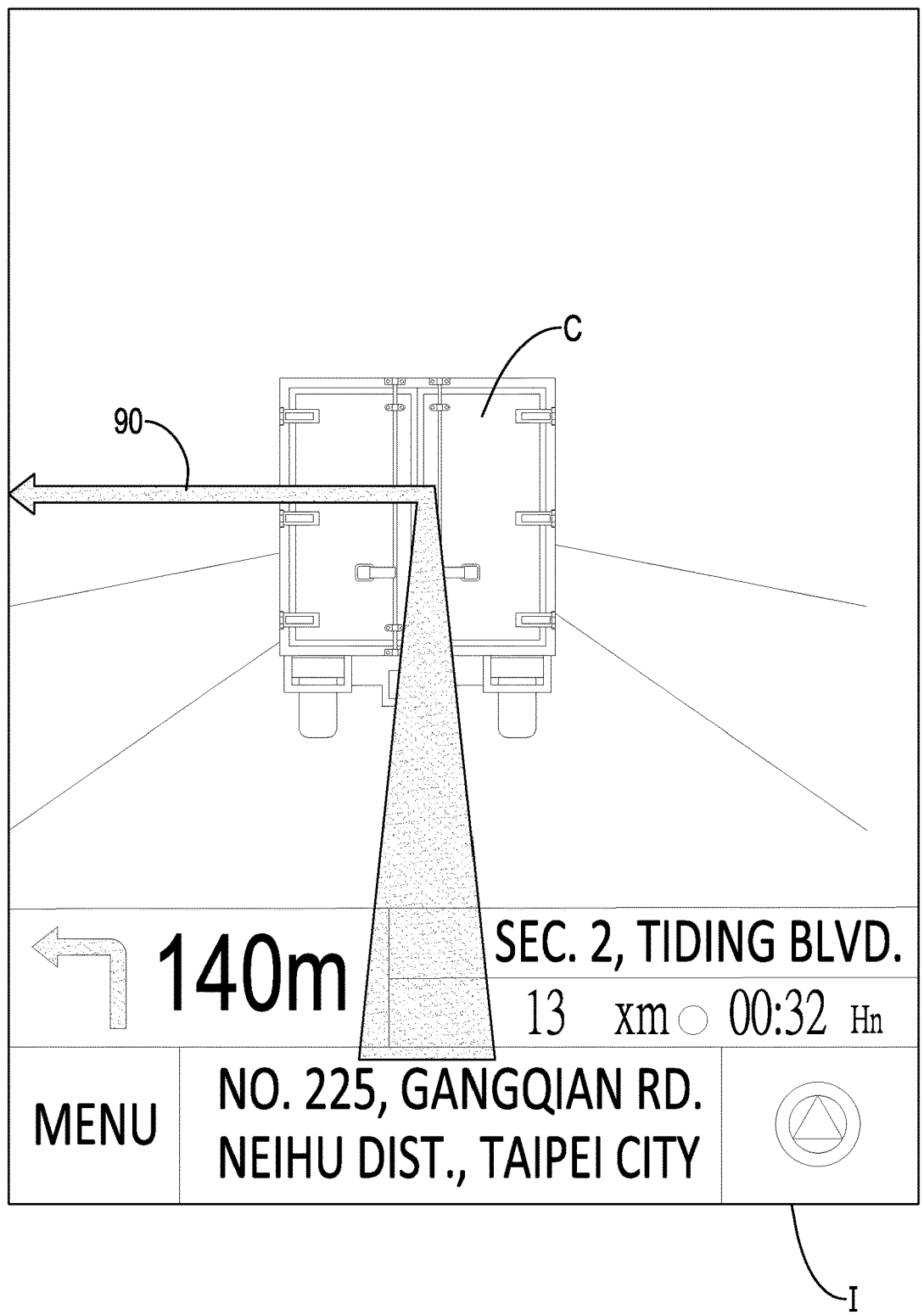
FIG. 13 is a screen display perspective view of a conventional navigator.

With reference to FIG. 12, since the calculating device 20 is able to identify and distinguish the at least two lanes 31, when the vehicle 10 needs a turn, the calculating device 20 is able to map the navigation route 351 smoothly based on the moving route and the distinguished at least two lanes 31. If the vehicle 10 is driving in an inner lane before a right turn, the calculating device 20 is able to navigate the vehicle 10 to first go to an outer lane before making the right turn with the navigation route 351, avoiding a dangerous situation of instructing the driver to boldly make a right turn when the driver and the vehicle 10 are still in the inner lane.

The embodiment of the present invention described above is just an example, rather than a limitation for the present invention. Any technical personnel may utilize contents of the embodiment described above and make slight changes or alterations within what is claimed for the present invention. All slight changes or alterations for contents of the embodiment described above however are all still encompassed by what is claimed for the present invention.

What is claimed is:

1. A method for generating a virtual navigation route, including the following steps:

obtaining a front video data, a moving route from a first point to a second point, and a navigation point data, wherein the navigation point data includes multiple navigation points, the navigation points are lined up accordingly on the moving route, and each of the navigation points is marked with a flag data;

identifying at least two lanes from the front video data;

creating a navigation characteristic image according to the flag data, the navigation points, the front video data, and the at least two lanes together, wherein the navigation characteristic image is rectangular and has multiple dotted grids;

calculating a probability of a navigation route passing through each of the dotted grids, and setting the dotted grid that has the highest probability calculated in each row of the navigation characteristic image as a first default value;

fitting curves for the grids with the first default value as the navigation route.

2. The method for generating a virtual navigation route as claimed in claim 1, wherein in the step of identifying the at least two lanes from the front video data, the following sub-steps are included:

employing semantic segmentation to the front video data and creating a semantic segmented characteristic image; and identifying the at least two lanes from the semantic segmented characteristic image.

3. The method for generating a virtual navigation route as claimed in claim 1, wherein in the step of identifying the at least two lanes from the front video data, the following sub-step is included:
    employing instance segmentation to the front video data and creating an instance segmented characteristic image; and
    identifying the at least two lanes from the instance segmented characteristic image.

4. The method for generating a virtual navigation route as claimed in claim 1, wherein a calculating device employs a method of softmax function to calculate the probability of the navigation route passing through each of the dotted grids.

5. The method for generating a virtual navigation route as claimed in claim 2, wherein a calculating device employs a method of softmax function to calculate the probability of the navigation route passing through each of the dotted grids.

6. The method for generating a virtual navigation route as claimed in claim 3, wherein a calculating device employs a method of softmax function to calculate the probability of the navigation route passing through each of the dotted grids.

7. The method for generating a virtual navigation route as claimed in claim 4, wherein in the step of obtaining the front video data, the moving route from the first point to the second point, and the navigation point data, the following sub-step is included:
    converting the front video data into a bird's eye view data.

8. The method for generating a virtual navigation route as claimed in claim 5, wherein in the step of obtaining the front video data, the moving route from the first point to the second point, and the navigation point data, the following sub-step is included:
    converting the front video data into a bird's eye view data.

9. The method for generating a virtual navigation route as claimed in claim 6, wherein in the step of obtaining the front video data, the moving route from the first point to the second point, and the navigation point data, the following sub-step is included:
    converting the front video data into a bird's eye view data.

10. The method for generating a virtual navigation route as claimed in claim 7, wherein after the step of fitting curves for the grids with the first default value as the navigation route, the following sub-step is included:
    converting the navigation route and the bird's eye view data into a frontal view data.

11. The method for generating a virtual navigation route as claimed in claim 8, wherein after the step of fitting curves for the grids with the first default value as the navigation route, the following sub-step is included:
    converting the navigation route and the bird's eye view data into a frontal view data.

12. The method for generating a virtual navigation route as claimed in claim 9, wherein after the step of fitting curves for the grids with the first default value as the navigation route, the following sub-step is included:
    converting the navigation route and the bird's eye view data into a frontal view data.

13. The method for generating a virtual navigation route as claimed in claim 10, wherein in the step of identifying the at least two lanes from the front video data, the following sub-step is included:
    identifying at least one vehicle from the front video data.

14. The method for generating a virtual navigation route as claimed in claim 11, wherein in the step of identifying the at least two lanes from the front video data, the following sub-step is included:
    identifying at least one vehicle from the front video data.

15. The method for generating a virtual navigation route as claimed in claim 12, wherein in the step of identifying the at least two lanes from the front video data, the following sub-step is included:
    identifying at least one vehicle from the front video data.

* * * * *